United States Patent [19]
Wolf

[11] Patent Number: 5,875,232
[45] Date of Patent: Feb. 23, 1999

[54] PERSONALIZED VOICE MAIL IDENTIFICATION SYSTEM

[75] Inventor: Richard J. Wolf, Crowley, Tex.

[73] Assignee: AST Research, Inc., Irvine, Calif.

[21] Appl. No.: 711,079

[22] Filed: Sep. 9, 1996

Related U.S. Application Data

[63] Continuation of Ser. No. 538,495, Sep. 29, 1995, abandoned.

[51] Int. Cl.$^6$ .................................................. H04M 1/64
[52] U.S. Cl. .............................................. 379/88; 379/142
[58] Field of Search ................................. 379/67, 88, 89, 379/142, 201, 207, 144

[56] References Cited

U.S. PATENT DOCUMENTS

| | | | |
|---|---|---|---|
| 4,481,384 | 11/1984 | Matthews | 179/18 |
| 4,672,660 | 6/1987 | Curtin | 379/88 |
| 4,747,126 | 5/1988 | Hood et al. | 379/74 |
| 4,850,005 | 7/1989 | Hashimoto | 379/88 |
| 4,899,358 | 2/1990 | Blakley | 379/67 |
| 4,935,956 | 6/1990 | Hellwarth et al. | 379/112 |
| 5,007,076 | 4/1991 | Blakley | 379/67 |
| 5,093,858 | 3/1992 | Hird et al. | 379/144 |
| 5,177,780 | 1/1993 | Kasper et al. | 379/59 |
| 5,265,145 | 11/1993 | Lim | 379/88 |
| 5,289,530 | 2/1994 | Reese | 379/88 |
| 5,329,578 | 7/1994 | Brennan et al. | 379/97 |
| 5,349,638 | 9/1994 | Pitroda et al. | 379/142 |
| 5,369,699 | 11/1994 | Page et al. | 379/38 |
| 5,434,906 | 7/1995 | Robinson et al. | 379/67 |
| 5,434,907 | 7/1995 | Hurst et al. | 379/88 |
| 5,511,111 | 4/1996 | Serbetcioglu et al. | 379/142 |
| 5,526,406 | 6/1996 | Luneau | 379/142 |
| 5,533,102 | 7/1996 | Robinson et al. | 379/67 |
| 5,737,392 | 4/1998 | Cheng et al. | 379/355 |

FOREIGN PATENT DOCUMENTS

| | | | |
|---|---|---|---|
| 61-65651 | 4/1986 | Japan | 379/67 |
| 2260670 | 4/1993 | United Kingdom | 379/90 |

*Primary Examiner*—Fan S. Tsang
*Attorney, Agent, or Firm*—Knobbe, Martens, Olson & Bear, LLP

[57] ABSTRACT

A personalized voice mail identification system is enclosed. In a preferred embodiment, the system of the present invention resides on a personal computer (PC) connected to a phone line via a TAPI-compliant or other appropriate device for enabling telephone functions to be performed by the PC. In one aspect of the invention, when a caller calls a system subscriber, a callerID code, if present, is detected and a determination is next made whether there is an ID recording comprising the spoken caller's name associated with the callerID code already stored in a database of the system. If there is an ID recording for the caller in the database, the recording is accessed and played to the subscriber as part of a call screening function. Alternatively, if no callerID code was detected or if there is not an ID recording associated with the caller in the database, the caller is prompted to speak his or her name into the phone, at which point the caller's name is announced to the subscriber and the ID recording is stored in the database in association with the callerID code, if one was detected. In another aspect of the invention, the accessed ID recording is incorporated into an audio message header of a message left by the caller when the subscriber is unavailable.

32 Claims, 1 Drawing Sheet

PERSONALIZED VOICE MAIL IDENTIFICATION SYSTEM

This is a continuation of application Ser. No. 08/583,495 filed on Sep. 29, 1995, now abandoned.

TECHNICAL FIELD

The invention relates generally to voice mail systems and, more particularly, to method and apparatus for providing personalized identification for messages recorded using such voice mail systems.

BACKGROUND OF THE INVENTION

A voice mail system is a record and playback system that allows a caller to record a message for a designated recipient, or subscriber, who is not available to take the call at the time the call is received in the system. The caller's message is typically digitized and stored in a central memory device and associated with the designated recipient's "mailbox address." Only the designated subscriber can subsequently retrieve the messages associated with his or her mailbox address. The set of messages designated as being for a single subscriber is commonly referred to as the subscriber's "voice mailbox," although the messages for a single subscriber may be stored throughout the memory device, rather than being stored together in one area of the device.

In some voice mail systems, such as systems commercially available from Octel Communications Corporation, VMX, Inc., and IBM Corporation, if the caller calls from a telephone from within a PBX with which the system is associated, the system will identify the caller by name, by matching the extension from which the caller is calling with an audio file, such that the name of the caller recorded in the caller's own voice may be played, e.g., as a part of a message header, to the subscriber when the subscriber retrieves his or her messages from the mailbox. However, if a caller calls from a telephone that is not within the PBX, the system will only be able to determine, and perhaps indicate, that the caller is "an outside caller" and will not be able to provide to the subscriber the spoken name of the caller.

Another deficiency of current voice mail systems is that they do not support a user-friendly call screening function. For example, if a subscriber is desirous of receiving or avoiding only calls from a particular caller, it would be helpful for the subscriber to be informed, before he or she must decide whether to answer the phone, the name of the person who is calling. "CallerID" systems are available to indicate to the subscriber the name and/or telephone number of the caller; however, because this information is presented on a display associated with the telephone, rather than announced to the subscriber, the subscriber must be standing near enough to the telephone to read the display and determine whether to answer the call. This feature, therefore, has little benefit when the subscriber is in another room.

Therefore, what is needed is a system for identifying callers into a voice mail system by name, and using such identification for performing personalized caller identification and screening.

SUMMARY OF THE INVENTION

The present invention, accordingly, provides a personalized voice mail identification system enhancement that overcomes or reduces disadvantages and limitations associated with prior methods and systems. In a preferred embodiment, the system of the present invention resides on a personal computer (PC) connected to a phone line via a TAPI-compliant or other appropriate device for enabling telephone functions to be performed by the PC.

In one aspect of the invention, when a caller calls a system subscriber, a callerID code, if present, is detected and a determination is next made whether there is an ID recording comprising the caller's name associated with the callerID code, and hence the caller, already stored in a database of the system. If there is an ID recording for the caller already stored in the database, the recording is accessed and played to the subscriber as part of a call screening function, if that function has been activated. Alternatively, if no callerID code was detected or if there is not an ID recording associated with the caller already stored in the database, the caller is asked to speak his or her name into the phone, at which point the caller is announced to the subscriber, if the call screening function has been activated, and the ID recording is stored in the database in association with the callerID code, if one was detected.

In another aspect of the invention, the accessed ID recording is incorporated into an audio message header of a message left by the caller when the subscriber is unavailable. Such a header could be, for example, "Message from [ID recording] sent [date], at [time]" where "[ID recording]" represents the content of the ID recording from the database, i.e., the caller's spoken name. In this manner, regardless of whether the name of the caller was "known" to the system prior to the call, the caller's name can be announced to the subscriber when he or she retrieves the messages left in his or her mailbox.

A technical advantage achieved with the invention is that it enables calls to be screened by a subscriber using the caller's name as spoken by the caller.

Another technical advantage achieved with the invention is that it enables call screening to be performed without the knowledge of the caller.

Another technical advantage achieved with the invention is that it automatically provides the caller's spoken name in the message header, regardless of whether the caller is an "internal" or "external" caller.

DESCRIPTION OF THE PREFERRED EMBODIMENTS

Figure 1:
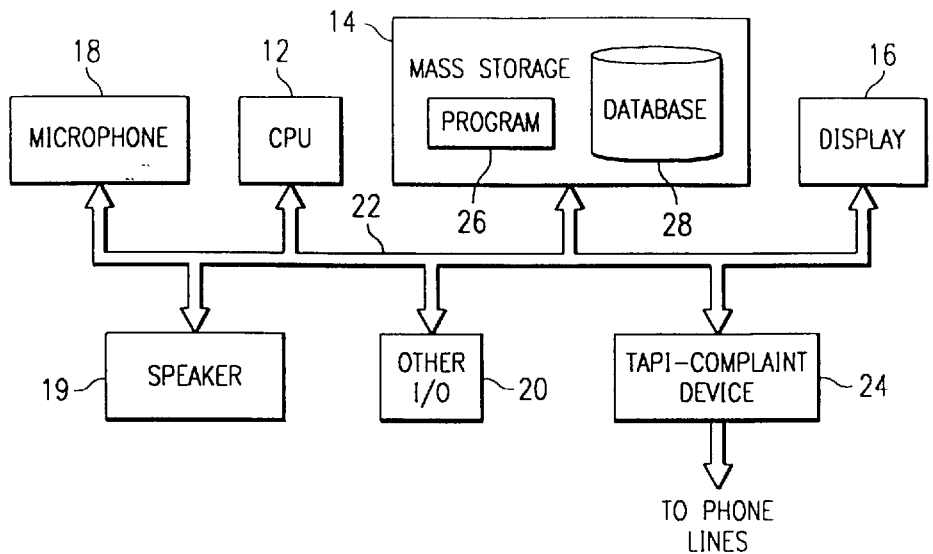
FIG. 1 is a block diagram of a personal computer embodying features of the present invention.

FIG. 1 illustrates a personal computer ("PC") 10 embodying features of the present invention. In particular, as shown in FIG. 1, the PC 10 comprises a central processing unit ("CPU") 12, a mass storage device 14, a display 16, a speaker 18, a microphone 19 and other I/0 devices, collectively designated by a reference numeral 20, interconnected via one or more computer buses, shown in FIG. 1 as a bus 22. At least one Telephony Application Programming Interface ("TAPI") compliant device 24 is provided on the bus 22 for connecting the components of the PC 10 to a telephone line (not shown) and for providing the PC 10 with standard telephone capabilities. It will be recognized by those skilled in the art that "TAPI," which was jointly developed by Microsoft Corporation of Redmond, Washington, and Intel Corporation of Santa Clara, Calif., defines an interface between Microsoft Windows applications and telephone devices for providing a standard way to build telephone capabilities into Windows software. Alternatively, the device 24 may be a voice modem or other appropriate device for performing the above-described functions.

Instructions for implementing a personalized voice mail identification system embodying features of the present invention, designated by a reference numeral 26, are stored in mass storage device 14 for execution by the CPU 12. Also stored in mass storage device 14 is a database 28 for storing ID recordings containing the spoken name of callers associated with particular callerID codes, as will be described.

Figure 2:
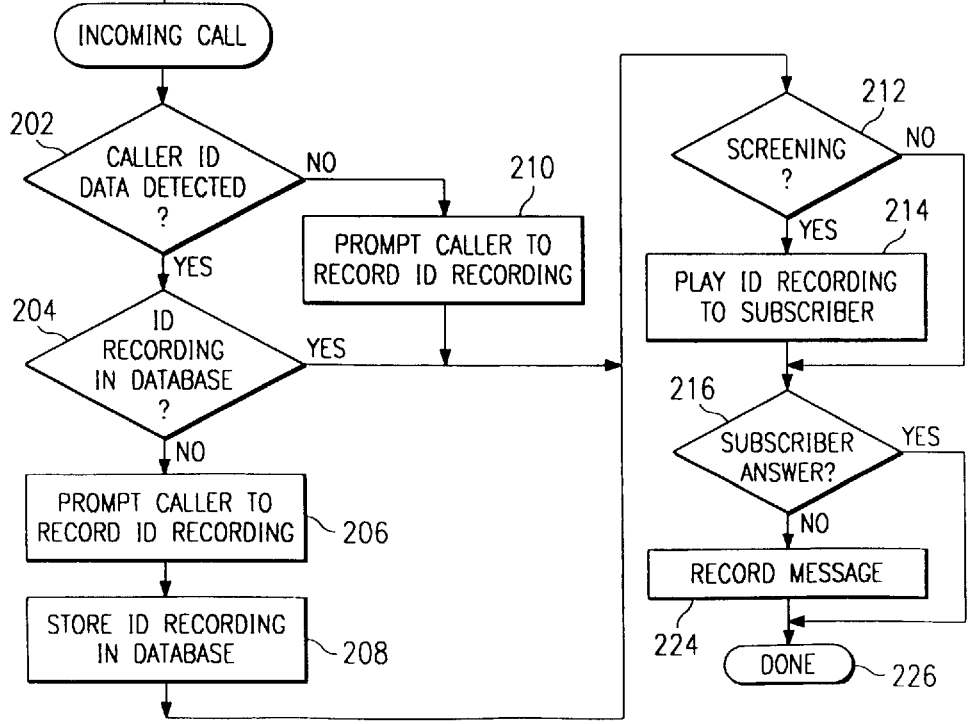
FIG. 2 is a flowchart of the operation of the system of the present invention.

FIG. 2 is a flowchart of the operation of the personalized voice mail system 26. Operation begins in step 200 in response to an incoming call. In step 202, a determination is made whether callerID data is present. If so, execution proceeds to step 204, in which a determination is made whether there is an ID recording in the database corresponding to the detected callerID data. If not, execution proceeds to step 206, in which the caller is prompted to record an ID recording by speaking his or her name into the caller's telephone (not shown) and the recording is stored in the database in step 208.

If in step 202 callerID data is not detected, execution proceeds to step 210, in which the caller is prompted to record an ID recording, again, by speaking his or her name into the caller's telephone. If in step 204 it is determined that there is an ID recording in the database corresponding to the detected callerID data, execution proceeds to step 212. Similarly, upon completion of step 208 or 210, execution proceeds directly to step 212.

In step 212, a determination is made whether the call screening function has been activated, it being understood that such activation could occur in a variety of ways, such as setting a flag or the like. If the call screening function has been enabled, execution proceeds to step 214, in which the caller's ID recording accessed in step 204 or recorded in step 206 or 210 is played to the subscriber, at which point execution proceeds to step 216. If in step 212 it is determined that the call screening function is not activated, execution proceeds directly to step 216. In step 216, a determination is made whether the subscriber has answered the call. If not, execution proceeds to step 224, in which the caller's message is recorded and stored in the appropriate mailbox. Execution of the personalized voice mail system terminates in step 226. Similarly, if in step 216 the subscriber answers the call, execution proceeds directly to step 226.

In this manner, the system of the present invention provides several enhanced features to a basic voice mail system. First, it provides a means by which the spoken name, rather than simply the phone number, of the caller is automatically provided to the subscriber, thereby enabling the subscriber to determine whether or not he or she wishes to take the call. In addition, it provides a means by which the name of a caller outside a PBX may be determined and incorporated into a message header such that the caller's name is automatically announced to the subscriber when he or she retrieves his or her messages.

It is understood that the present invention can take many forms and embodiments, the embodiments shown herein are intended to illustrate rather than limit, the invention, it being understood that variations may be made without departing from the spirit of the scope of the invention. For example, a number of ID recordings could be prerecorded by the subscriber and stored in the database associated with the appropriate callerID data. This might be advantageous, for example, where a subscriber expects to receive a number of calls from particular persons, such as family members, business associates and personal friends, and would spare the caller from the relatively minor inconvenience of having to record his or her name.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of implementing a personalized voice mail identification system on a personal computer connected to a telephone line, the method comprising:

detecting callerID data associated with a call on said telephone line;

responsive to detection of said callerID data, determining whether an associated ID recording is already stored in association with said detected callerID data in a database of said system, said associated ID recording comprising the spoken name of a caller in said caller's own voice identified by said detected callerID data; and responsive to a determination that said associated ID recording is already stored in said database, playing said associated ID recording to a subscriber.

2. The method of claim 1 wherein said associated ID recording is played to said subscriber prior to said subscriber answering said call.

3. The method of claim 1 wherein said associated ID recording is played to said subscriber only if a call screening function of said system is activated.

4. The method of claim 1 further comprising:

responsive to said subscriber not answering said call, prompting said caller to record a message for said subscriber; and inserting contents of said ID recording in a message header of said message, said message header being played to said subscriber when said subscriber listens to said recorded message.

5. The method of claim 1 further comprising, responsive to said callerID data not being detected:

prompting said caller to record a name of said caller; and playing said recorded name to said subscriber prior to said subscriber answering said call.

6. A method of implementing a personalized voice mail identification system on a personal computer connected to a telephone line, the method comprising:

detecting callerID data associated with a call on said telephone line;

responsive to detection of said callerID data, determining whether an associated ID recording is stored in association with said detected callerID data in a database of said system, said associated ID recording comprising the spoken name of a caller in said caller's own voice identified by said detected callerID data;

responsive to a determination that said associated ID recording is stored in said database, playing said associated ID recording to a subscriber; and responsive to a determination that said associated ID recording associated with said detected callerID data is not stored in said database:

prompting said caller to record said associated ID recording; and storing said associated ID recording in said database in association with said detected callerID data.

7. The method of claim 6 wherein said associated ID recording is played to said subscriber prior to said subscriber answering said call.

8. The method of claim 6 wherein said associated ID recording is played to said subscriber only if a call screening function of said system is activated.

9. The method of claim 6 further comprising:

responsive to said subscriber not answering said call, prompting said caller to record a message for said subscriber; and inserting contents of said ID recording in a message header of said message, said message header being played to said subscriber when said subscriber listens to said recorded message.

10. The method of claim 6 further comprising, responsive to said callerID data not being detected:

prompting said caller to record a name of said caller; and playing said recorded name to said subscriber prior to said subscriber answering said call.

11. A method of implementing a personalized voice mail identification system using a personal computer connected to a telephone line, the method comprising:

determining whether an incoming call on said telephone line has callerID data associated therewith;

responsive to a determination that said incoming call does have callerID data associated therewith:

determining whether an associated ID recording is stored in association with said detected callerID data in a database of said system, said associated ID recording comprising the spoken name of a caller in said caller's own voice identified by said detected callerID data; and responsive to a determination that said associated ID recording is stored in said database, playing said associated ID recording to a subscriber prior to said subscriber answering said call; and responsive to a determination that said associated ID recording is not stored in said database, prompting a caller to record said associated ID recording and storing said associated ID recording in said database, said associated ID recording being referenced in said database by said detected callerID data; and responsive to a determination that said incoming call does not have callerID data associated therewith:

prompting said caller to record a name of said caller; and playing said recorded name to said subscriber prior to said subscriber answering said call.

12. The method of claim 11 further comprising, prior to said playing said associated ID recording to said subscriber, determining whether a call screening function of said system is activated and playing said ID recording to said subscriber only if said call screening function of said system is activated.

13. The method of claim 11 further comprising, prior to playing said recorded name to said subscriber, determining whether a call screening function of said system is activated and playing said recorded name to said subscriber only if said call screening function of said system is activated.

14. The method of claim 11 further comprising:

responsive to said subscriber not answering said call, prompting said caller to record a message for said subscriber; and inserting contents of said associated ID recording in a message header of said message, said message header being played to said subscriber when said subscriber listens to said recorded message.

15. In a personal computer comprising a processor and at least one storage device, an apparatus connectable to a telephone line for implementing a personalized voice mail identification system, the apparatus comprising:

means for detecting callerID data associated with a call on said telephone line;

means responsive to detection of said callerID data for determining whether an associated ID recording is already stored in association with said detected callerID data in a database of said system, said associated ID recording comprising the spoken name of a caller in said caller's own voice identified by said detected callerID data; and means responsive to a determination that an associated ID recording is already stored in said database for playing said ID recording to a subscriber.

16. The apparatus of claim 15 wherein said ID recording is played to said subscriber prior to said subscriber answering said call.

17. The apparatus of claim 15 wherein said associated ID recording is played to said subscriber only if a call screening function of said system is activated.

18. The apparatus of claim 15 further comprising:

means responsive to said subscriber not answering said call for prompting said caller to record a message for said subscriber; and means for inserting contents of said ID recording in a message header of said message, said message header being played to said subscriber when said subscriber listens to said recorded message.

19. The apparatus of claim 15 further comprising means responsive to said callerID data not being detected for prompting said caller to record a name of said caller and playing said recorded name to said subscriber prior to said subscriber answering said call.

20. In a personal computer comprising a processor and at least one storage device, an apparatus connectable to a telephone line for implementing a personalized voice mail identification system, the apparatus comprising:

means for detecting callerID data associated with a call on said telephone line;

means responsive to detection of said callerID data for determining whether an associated ID recording is stored in association with said detected callerID data in a database of said system, said associated ID recording comprising the spoken name of a caller in said caller's own voice identified by said detected callerID data;

means responsive to a determination that an associated ID recording is stored in said database for playing said ID recording to a subscriber; and means responsive to a determination that an associated ID recording is not stored in said database for prompting said caller to record said associated ID recording and storing said associated ID recording in said database, said associated ID recording being referenced in said data base by said detected callerID data.

21. The apparatus of claim 20 wherein said ID recording is played to said subscriber prior to said subscriber answering said call.

22. The apparatus of claim 20 wherein said associated ID recording is played to said subscriber only if a call screening function of said system is activated.

23. The apparatus of claim 20 further comprising:

means responsive to said subscriber not answering said call for prompting said caller to record a message for said subscriber; and means for inserting contents of said ID recording in a message header of said message, said message header being played to said subscriber when said subscriber listens to said recorded message.

24. The apparatus of claim 20 further comprising means responsive to said callerID data not being detected for prompting said caller to record a name of said caller and playing said recorded name to said subscriber prior to said subscriber answering said call.

25. In a computer comprising a processor, a hard disk and system memory electrically interconnected via a bus and connectable to a telephone line, an apparatus for implementing a personalized voice mail identification system, the apparatus comprising:

logic executable by said processor for detecting callerID data associated with a call on said telephone line;

logic executable by said processor responsive to detection of said callerID data for determining whether an associated ID recording is already in association with said detected callerID data in a database of said system, said associated ID recording comprising the spoken name of a caller in said caller's own voice identified by said detected callerID data; and logic executable by said processor responsive to a determination that said associated ID recording is already stored in said database for playing said ID recording to a subscriber.

26. The apparatus of claim 25 wherein said ID recording is played to said subscriber prior to said subscriber answering said call.

27. The apparatus of claim 25 further comprising:

logic executable by said processor responsive to said subscriber not answering said call for prompting said caller to record a message for said subscriber; and logic executable by said processor for inserting contents of said ID recording in a message header of said message, said message header being played to said subscriber when said subscriber listens to said recorded message.

28. The apparatus of claim 25 further comprising logic executable by said processor responsive to said callerID data not being detected for prompting said caller to record said associated ID recording.

29. In a computer comprising a processor, a hard disk and system memory electrically interconnected via a bus and connectable to a telephone line, an apparatus for implementing a personalized voice mail identification system, the apparatus comprising:

logic executable by said processor for detecting callerID data associated with a call on said telephone line;

logic executable by said processor responsive to detection of said callerID data for determining whether an associated ID recording is stored in association with said detected callerID data in a database of said system, said associated ID recording comprising the spoken name of a caller in said caller's own voice identified by said detected callerID data;

logic executable by said processor responsive to a determination that said associated ID recording is stored in said database for playing said ID recording to a subscriber; and logic executable by said processor responsive to a determination that said associated ID recording is not stored in said database for prompting said caller to record said associated ID recording and storing said associated ID recording in said database, said associated ID recording being referenced in said database by said detected callerID data.

30. The apparatus of claim 29 wherein said ID recording is played to said subscriber prior to said subscriber answering said call.

31. The apparatus of claim 29 further comprising:

logic executable by said processor responsive to said subscriber not answering said call for prompting said caller to record a message for said subscriber; and logic executable by said processor for inserting contents of said ID recording in a message header of said message, said message header being played to said subscriber when said subscriber listens to said recorded message.

32. The apparatus of claim 29 further comprising logic executable by said processor responsive to said callerID data not being detected for prompting said caller to record said associated ID recording.

* * * * *